(12) United States Patent
Chance et al.

(10) Patent No.: US 9,101,093 B2
(45) Date of Patent: Aug. 11, 2015

(54) WATER/CARBONATE STRIPPING FOR $CO_2$ CAPTURE ADSORBER REGENERATION AND $CO_2$ DELIVERY TO PHOTOAUTOTROPHS

(75) Inventors: Ronald Chance, Naples, FL (US);
William J. Koros, Atlanta, GA (US);
Benjamin McCool, Bonita Springs, FL (US); James Noel, Atlanta, GA (US)

(73) Assignees: Algenol Biotech LLC, Fort Myers, FL (US); Georgia Tech Research Corp., Atlanta, GA (US)

( * ) Notice: Subject to any disclaimer, the term of this patent is extended or adjusted under 35 U.S.C. 154(b) by 418 days.

(21) Appl. No.: 13/417,172

(22) Filed: Mar. 9, 2012

(65) Prior Publication Data

US 2012/0171752 A1   Jul. 5, 2012

Related U.S. Application Data

(63) Continuation-in-part of application No. PCT/US2010/059684, filed on Dec. 9, 2010.

(60) Provisional application No. 61/267,968, filed on Dec. 9, 2009.

(51) Int. Cl.
    *B01D 53/02*   (2006.01)
    *A01G 7/02*    (2006.01)

(52) U.S. Cl.
    CPC .................................... *A01G 7/02* (2013.01)

(58) Field of Classification Search
    CPC ............................................ A01G 7/02
    See application file for complete search history.

(56) References Cited

U.S. PATENT DOCUMENTS

| | | |
|---|---|---|
| 7,699,909 B2 | 4/2010 | Lackner et al. |
| 7,708,806 B2 | 5/2010 | Wright et al. |
| 2006/0266217 A1 | 11/2006 | Jensvold |
| 2007/0022877 A1 | 2/2007 | Marand et al. |

(Continued)

FOREIGN PATENT DOCUMENTS

| | | |
|---|---|---|
| EP | PCT/EP2009/000892 | 8/2009 |
| WO | WO2008042919 | 10/2008 |
| WO | WO2011072122 | 6/2011 |

OTHER PUBLICATIONS

U.S. Appl. No. 61/267,968, filed Dec. 9, 2009.

(Continued)

*Primary Examiner* — Christopher P Jones
(74) *Attorney, Agent, or Firm* — Lawrence B. Ebert; David J. Lorenz

(57) ABSTRACT

The invention provides systems and methods for the delivery of carbon to photoautotrophs. The invention utilizes low energy regeneration of adsorbent for $CO_2$ capture and provides for effective $CO_2$ loading into liquids useful for photoautotroph growth and/or production of photosynthetic products, such as biofuels, via photoautotrophic culture media. The inventive system comprises a fluid/membrane/fluid contactor that provides selective transfer of molecular $CO_2$ via a dense (non-porous) membrane from a carbonate-based $CO_2$ snipping solution to a culture medium where the $CO_2$ is consumed by a photoautotroph for the production of biofuels, biofuel precursors or other commercial products.

17 Claims, 15 Drawing Sheets

(56) References Cited

U.S. PATENT DOCUMENTS

| | | |
|---|---|---|
| 2008/0087165 A1 | 4/2008 | Wright et al. |
| 2008/0138265 A1 | 6/2008 | Lackner et al. |
| 2009/0120288 A1 | 5/2009 | Lackner et al. |
| 2009/0232861 A1 | 9/2009 | Wright et al. |
| 2012/0107792 A1* | 5/2012 | Babbitt et al. .................... 435/3 |

OTHER PUBLICATIONS

Ball, "Eukaryotic Microalgae Genomics: The Essence of Being a Plant," Plant Physiology 137: 397-398 (2005).

Koros et al., "Technology for Membranes and Membrane Processes (IUPAC Recommendations 1996)," Pure and Applied Chemistry, vol. 68, pp. 1479-1489 (1996).

Green et al., Chemical Engineers' Handbook, Eighth Edition, ISBN: 0071422943, p. 17-18.

K. Sato et al., "Development of practically available up-scaled high-silica CHA-type zeolite membranes for industrial purpose in dehydration of N-methyl pyrrolidone solution", Journal of Membrane Science 409-410 (2012) 82-95.

Meille et al., "Definitions Of Terms Relating To Crystalline Polymers (IUPAC Recommendations 2011)", Pure and Applied Chemistry, vol. 83, pp. 1831-1871 (2011).

McGraw-Hill Dictionary of Architecture and Construction (2003), p. 359.

Kim et al., "Enthalpy of absorption of CO2 with alkanolamine solutions predicted from reaction equilibrium constants," Chemical Engineering Science, 64(9): 2027 (2009).

Kim et al., "Heat of absorption of carbon dioxide (CO2) in monoethanolamine (MEA) and 2-(aminoethyl) ethanolamine (AEEA) solutions, Industrial & Engineering Chemistry Research," 46 (2007), pp. 5803.

Belmabkhout et al., "Adsorption" (2009) 15: pp. 318-328.

Green et al., Chemical Engineers' Handbook, Eighth Edition, ISBN: 0071422943, p. 17-18 (2007).

Luo et al., Life Cycle Energy and Greenhouse Gas Emissions for an Ethanol Production Process Based on Blue-Green Algae. Environmental Science & Technology 2010, 44, (22), 8670-8677.

Solomon et al., IPCC 2007: Climate Change 2007: The Physical Science Basis. Contribution of Working Group I to the Fourth Assessment Report of the Intergovernmental Panel on Climate Change. Cambridge University Press, Cambridge, United Kingdom and New York, NY, USA, 2007.

Noel et al., Membrane-Mediated Delivery of Carbon Dioxide for Consumption by Photoautotrophs: Eliminating Thermal Regeneration in Carbon Capture, Ind. Eng. Chem. Res. 2012, 51, 4673-4681.

Treut et al., Historical Overview of Climate Change. In: Climate Change 2007: The Physical Science Basis. Contribution of Working Group I to the Fourth Assessment Report of the Intergovernmental Panel on Climate Change. Cambridge University Press, Cambridge, United Kingdom and New York, NY, USA.

Knuutila, H. et al., "CO2 capture from coal-fired power plants based on sodium carbonate slurry; a systems feasibility and sensitivity study," International Journal of Greenhouse Gas Control 3 (2009) pp. 143-151.

Felder and Rousseau, "Principles of Chemical Processes," 3rd Ed., John Wiley and Sons (2005).

Lee, L.L., "Thermodynamic models for natural gas sweetening fluids," Report on GPI/GPA Project 5091-260-2288, University of Oklahoma, Norman, OK, USA (1996) p. 216.

Lee, L.L., "Thermodynamic models for natural gas sweetening fluids," Annual Report, GRI Contract No. 5091-260-2288, University of Oklahoma, Norman, OK, USA (1994).

* cited by examiner

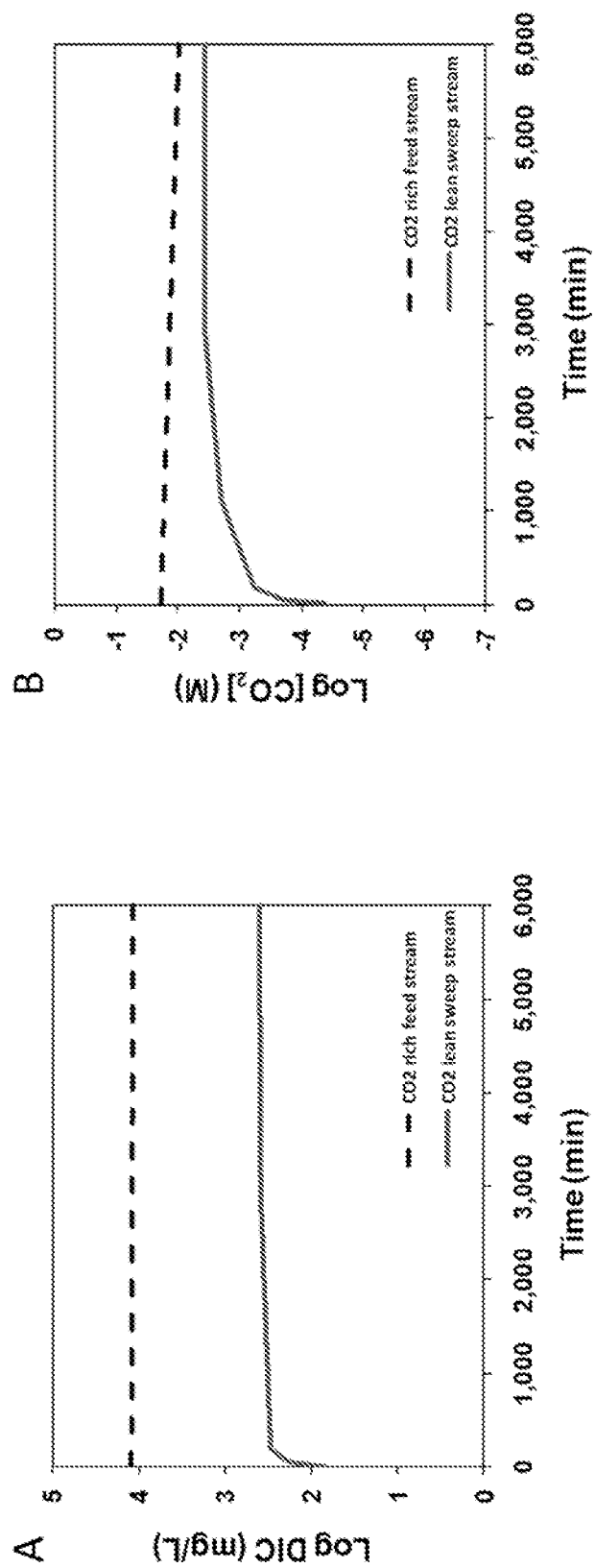

WATER/CARBONATE STRIPPING FOR $CO_2$ CAPTURE ADSORBER REGENERATION AND $CO_2$ DELIVERY TO PHOTOAUTOTROPHS

CROSS-REFERENCE TO RELATED APPLICATIONS

This application is a bypass continuation-in-part of PCT application number PCT/US2010/059684, filed Dec. 9, 2010, which claims priority to U.S. provisional application 61/267, 968, filed Dec. 9, 2009. Both applications are incorporated by reference herein in their entirety.

STATEMENT REGARDING FEDERALLY SPONSORED RESEARCH OR DEVELOPMENT

This invention was made with government support under Award Number DE-FOA-0000096 awarded by the Department of Energy. The government has certain rights in the invention.

JOINT RESEARCH AGREEMENT

This invention was made as a result of activities undertaken within the scope of a Joint Research Agreement between Algenol Biofuels, Inc. and Georgia Tech Research Corporation.

BACKGROUND OF THE INVENTION

1. Field of the Invention

The invention relates to the fields of chemistry and biology. More specifically, the invention relates to capture of $CO_2$ from a gas phase and subsequent delivery of the carbon to a medium promoting the growth of photoautotrophic organisms and the production of biofuels therefrom.

2. Description of the Related Art

Global warming is largely attributed to an increase in atmospheric $CO_2$, which results from the combustion of fossil fuels. In order to combat this phenomena, a great deal effort focuses on removal of $CO_2$ from the atmosphere, industrial sources and gas processing sources via various capture methodologies.

US Patent Application Publication No. 2008/0138265 [leading to U.S. Pat. No. 7,699,909] discloses methods and systems for extracting, capturing, reducing, storing, sequestering, or disposing of carbon dioxide ($CO_2$), particularly from the air. US Patent Application Publication No. 2008/0087165 to Wright et al. (leading to U.S. Pat. No. 7,708,806 and in the family of PCT Application No. PCT/US2007/080229) discloses the extraction of $CO_2$ from air using conventional extraction methods or by using a humidity swing or electro dialysis method, and the subsequent delivery of $CO_2$ to a greenhouse or algal culture using a porous membrane. US Patent Application Publication No. 2009/0232861 to Wright et al. discloses the extraction of $CO_2$ from a fluid stream and the delivery of $CO_2$ to controlled environments using a porous membrane, where the $CO_2$ is utilized by a secondary process. US Patent Application Publication No. 2009/0120288 discloses the removal of carbon dioxide, from ambient air various sorbent technologies. In addition, there are numerous publications and patents describing capture and sourcing of $CO_2$ from anthropogenic streams (e.g., flue gas from coal fired power plants).

In adsorption-based $CO_2$ capture, the regeneration of the loaded adsorbent poses several potential hurdles. Of primary concern is the amount of energy required, i.e. steam generation, and chemical stability of the sorbent within the stripping environment, especially for amine-functionalized sorbents in a steam stripping environment. In addition the delivery of $CO_2$ to algal photobioreactors must also overcome several technical challenges including the need to deliver pure $CO_2$ to the reactor and minimize the headspace volume that nitrogen and other inert gases occupy in the photobioreactor, the solubility limit of $CO_2$ in the aqueous phase if delivery through the water stream is preferred, the energy penalties incurred with transport of large volumes of gas to many modular reactors if gas phase delivery is selected and the need to avoid alteration of the ionic content of the photoautotrophic culture medium, which could compromise the health and productivity of the photoautotrophs. None of the cited references addresses these concerns. However, in the present invention we present a process invention for integrated sorbent regeneration and $CO_2$ delivery that addresses these technical concerns.

BRIEF SUMMARY OF THE INVENTION

The utilization of low energy regeneration of adsorbent (no steam generation needed), simple low energy chemistry, and inexpensive active materials, e.g., soda ash, are utilized to provide for effective $CO_2$ loading in water or growth media for photoautotroph growth.

An object of this invention is a system for delivering carbon, in the form of $CO_2$ or bicarbonate, to a photoautotroph for the purpose of increasing the carbon available for consumption by the photoautotrophs, this being accomplished without ionic transport through the membrane to the photoautotrophic culture. In preferred embodiments, the system uses a $CO_2$ selective dense (non-porous) membrane to minimize or eliminate ionic transport through the membrane while providing a highly selective, facile transfer of $CO_2$ through the membrane and into the culture medium for consumption by the photoautotrophs.

A further object of this invention is a system for delivering carbon to a photoautotroph wherein resistance to mass transfer through a $CO_2$ selective membrane is minimized by increasing shear mixing at a surface of the membrane. In some embodiments, shear mixing is increased by increasing the flow rates of fluids across the surfaces of the membrane. In some embodiments, a baffle is disposed on a surface of the membrane or within the membrane housing element to increase shear mixing at the membrane surface.

In a first aspect, the invention provides a system for delivery of carbon to a photoautotroph. The system comprises a stream containing $CO_2$; a solid adsorbent comprising au amine or other solid sorbent suitable for $CO_2$ capture; a carbonate-based stripping fluid; a device for washing the $CO_2$ loaded sorbent with the carbonate stripping solution, thereby allowing the removal of $CO_2$ from the sorbent and formation of a bicarbonate contacting solution; a $CO_2$ selective dense (non-porous) membrane incorporated into a module allowing transfer of molecular $CO_2$ between the bicarbonate rich contacting fluid and a photoautotroph culture medium; and a microfiltration membrane which prevents direct contact between the algae and the bicarbonate contacting solution, wherein the photoautotroph culture medium is enriched with bicarbonate providing carbon for algal growth.

In a second aspect, the invention provides a method for delivering carbon to a photoautotroph. The method comprises providing a stream containing $CO_2$; passing the $CO_2$ over a solid adsorbent comprising an amine or other solid sorbent suitable for $CO_2$ capture; passing a carbonate-based stripping fluid over the $CO_2$ loaded sorbent, thereby allowing the removal of $CO_2$ from the sorbent and formation of a bicarbonate contacting solution; utilizing a $CO_2$ selective dense (non-porous) membrane that allows the transfer of molecular $CO_2$ between the bicarbonate rich contacting fluid and a photoautotroph culture medium; and utilizing a microfiltration membrane to prevent direct contact between the algae and the bicarbonate contacting solution, wherein the photoautotroph culture medium is enriched with bicarbonate providing carbon for algal growth.

BRIEF DESCRIPTION OF THE DRAWINGS

These and other features, aspects and advantages of this invention will become better understood with regard to the following description, appended claims and accompanying drawings where:

FIGS. 10A and B show A) the dissolved inorganic carbon (DIC) concentration and B) the aqueous $CO_2$ concentration of each solution as a function of time during the liquid/liquid membrane contactor experiment (Example 3).

DETAILED DESCRIPTION OF THE INVENTION

As used herein, the term "photoautotroph" refers to algae and cyanobacteria; more particularly it refers to macro algae or micro algae or cyanobacteria. As used herein, the term "macro algae" (seaweeds) refers to eukaryotic multicellular plants growing in salt, brackish or fresh water. They are classified into three broad groups based on their pigmentation: i) brown seaweed (Phaeophyceae); ii) red seaweed (Rhodophyceae) and iii) green seaweed (Chlorophyceae). Non-limiting examples include: *Laminaria, Undaria, Gracilaria, Ascophyllum, Euchetuna, Macrocystis, Lessonia, Chondrus, Sargassum*, and *Hizikia*.

As used herein, the term "micro algae" refers to eukaryotic photoautotrophic organisms that may be unicellular or filamentous and found to be growing in salt, brackish, and fresh water or growing on land (terrestrial species). Non-limiting examples of eukaryotic micro algae include the diatoms (Bacillariophyceae), the green algae (Chlorophyceae), and the golden algae (Chrysophyceae) and all those described in Eukaryotic Microalgae Genomics: The Essence of Being a Plant by Steven G. Ball ((2005) Plant Physiology 137: 397-398.

As used herein, the term "dense (non-porous) membrane" means a membrane with no detectable pores. See Koros et al., "Technology For Membranes And Membrane Processes (IUPAC Recommendations 1996)," Pure and Applied Chemistry, Vol. 68, pp. 1479-1489 (1996).

As used herein, the term "glassy polymer" means an amorphous polymer at temperatures below its glass-transition temperature. See Meille et al., "Definitions Of Terms Relating To Crystalline Polymers (IUPAC Recommendations 2011)", Pure and Applied Chemistry, Vol. 83, pp. 1831-1871 (2011).

As used herein, the term "rubbery polymer" means a macromolecular material such as rubber or a synthetic material having similar properties that returns rapidly to approximately the initial dimensions and shape after substantial deformation by a weak stress and release of the stress. McGraw-Hill Dictionary of Architecture and Construction (2003).

Cyanobacteria are photoautotrophic, prokaryotic organisms that may be unicellular or filamentous. Non-limiting include species of *Chamaesiphon, Chroococcidiopsis, Arthrospira, Anabaena, Chlorogloeopsis, Chroococcus, Dermocarpella, Geitlerinema, Anabaenopsis, Fischerella Cyanothece, Myxosarcina Leptolyngbya Aphanizomenon, Dactylococcopsis, Pleurocapsa, Lyngbya, Calothrix, Gloeobacter, Stanieria, Microcoleus, Cylindrospermum, Gloeocapsa, Xenococcus, Oscillatoria, Microchaete, Gloeothece, Pseudanabaena, Nodularia, Microcystis, Spiiulina, Nostoc, Synechococcus, Symploca, Scytonema, Synechocystis* and *Tolypothrix*.

Figure 1:
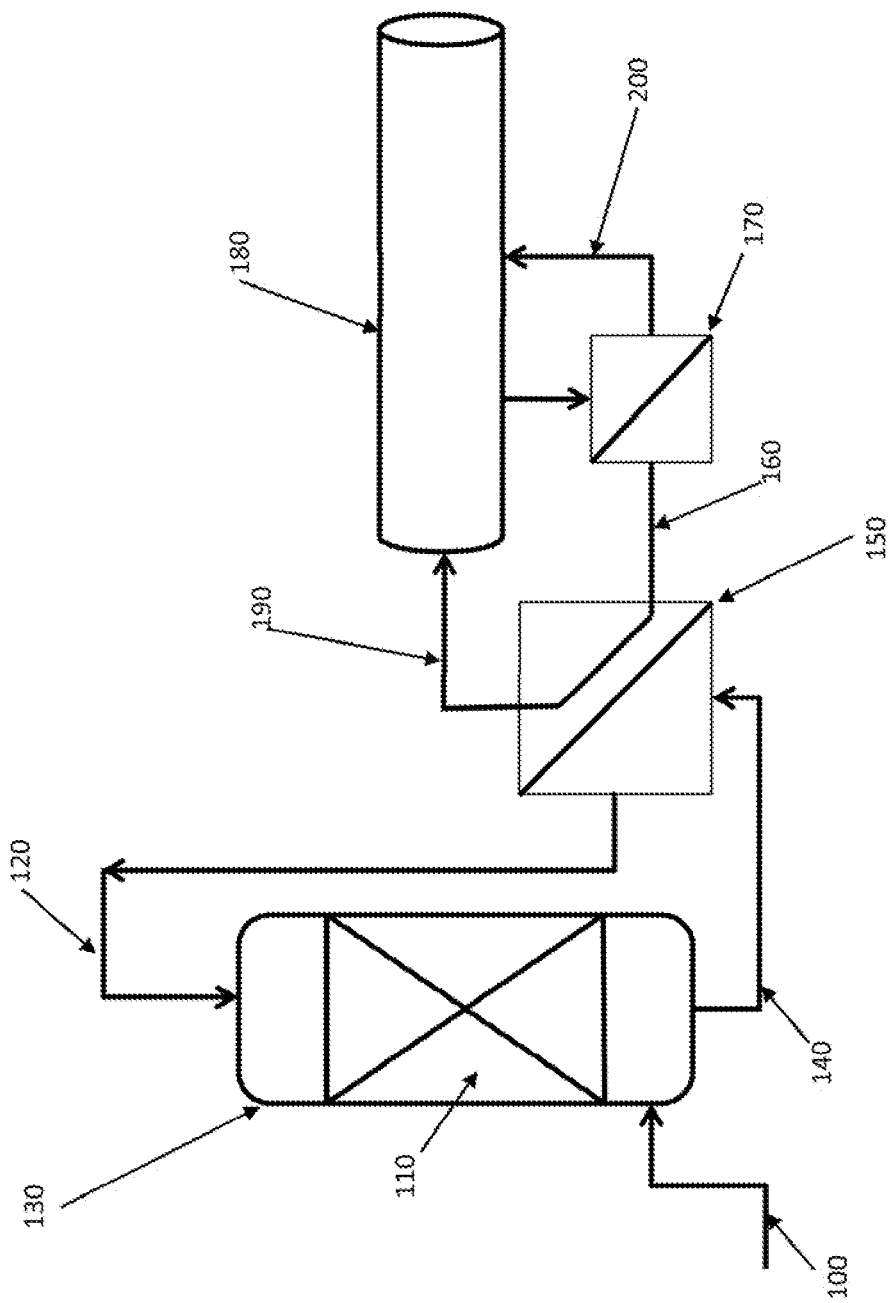
FIG. 1 is a schematic of an integrated system illustrating elements of the first embodiment of the invention.

An important aspect of the present invention is a process concept for integrated sorbent regeneration and $CO_2$ delivery that addresses technical concerns found in the prior art. This concept is illustrated in FIG. 1 which depicts a system for delivery of carbon species to a photoautotroph comprising a $CO_2$ feed stream 100, a solid sorbent 110 suitable for $CO_2$ capture, a carbonate-based stripping solution 120, a device 130 for contacting the $CO_2$ feed stream 100 with the solid sorbent 110 and washing the $CO_2$ loaded sorbent 110 with the carbonate stripping solution 120, thereby allowing the removal of $CO_2$ from the sorbent 110 and formation of a bicarbonate contacting solution 140, a $CO_2$ selective membrane 150 incorporated into a module allowing transfer of $CO_2$ between the bicarbonate rich contacting solution 140 and carbon-lean photoautotroph culture medium 160, a microfiltration membrane 170 which prevents direct contact between the photoautotrophs, such as algae, and the bicarbonate contacting solution 140 and a suspension culture 180 of photoautotrophs, from which carbon-lean culture medium 160 is drawn and to which carbon-rich culture medium 190 is returned from the $CO_2$ selective membrane 150 and photoautotroph-rich broth 200 is returned from the microfiltration membrane 170. The suspension culture 180 may be contained in a vessel such as, for example, a photobioreactor.

Embodiments of the concept illustrated in FIG. 1 could involve one sorbent 110 bed, or more than one sorbent 110 bed. The one sorbent 110 bed embodiment could be accomplished with the one sorbent 110 bed sorbing $CO_2$ at night, from ambient air for example, and desorbing/stripping during the day as that would match the demand pattern of photoautotrophs.

Reaction 1 illustrates a photosynthetic process whereby a photoautotroph converts $CO_2$ and water to ethanol, creating a $CO_2$ driving force across the membrane.

$$2CO_2 + 3H_2O \leftrightarrow C_2H_5OH + 3O_2 \quad \text{(Reaction 1)}$$

This process concept is based on the chemical reaction of carbonate with $CO_2$ and water to form a bicarbonate. The reaction of sodium carbonate to form sodium bicarbonate is illustrated in Reaction 2 (computed using Heats of Formation of all species from Felder and Rousseau, Principles of Chemical Processes, $3^{rd}$ ed., Joint Wiley and Sons, 2005).

$$Na_2CO_3 + H_2O + CO_2 \leftrightarrow 2NaHCO_3$$

$$\Delta H_{rxn} = -61.6 \text{ kJ/mol} \quad \text{(Reaction 2)}$$

The complete regeneration of an amine-based based sorption system involves removal of $CO_2$ from the carbamate complex that is formed during capture. The carbamate formation reaction is shown in Reaction 3.

$$2RNH_2 + CO_2 \leftrightarrow RNH_3^+ + RNHCOO^- \quad \text{(Reaction 3)}$$

$$\Delta H_{rxn} \approx -80 \text{ kJ/mol} \quad \text{(Reaction 3)}$$

It should be noted that the heat of reaction shown above is that for primary amines reacting with $CO_2$ (Kim, I, Hoff, K. A., Hessen E. T., Haug-Warberg, T., Svendsen, H. F., Enthalpy of absorption of $CO_2$ with alkanolamine solutions predicted from reaction equilibrium constants, Chemical Engineering Science, 64(9), 2009, 2027: Kim, I., and Svendsen, H. F., Heat of absorption of carbon dioxide ($CO_2$) in monoethanolamine (MEA) and 2-(aminoethyl)ethanolamine (AEEA) solutions, Industrial & Engineering Chemistry Research 46 (2007), pp. 5803; and Lee, L. L., 1996. Thermodynamic models for natural gas sweetening fluids. Report on GPI/GPA Project 5091-260-2288. University of Oklahoma, Norman, Okla., USA, pp. 216). A typical solid adsorbent used for $CO_2$ capture may be comprised of primary, secondary and tertiary amines. As a result the effective heat of reaction is expected to be in the range of −50 to −85 kJ/mol $CO_2$.

The net heat of reaction for removal of $CO_2$ from the loaded adsorbent into the aqueous phase is the difference in reaction energies from Reaction 2 minus Reaction 3, thereby producing a low regeneration energy requirement of about 18.4 kJ/mol (Reaction 4).

$$Na_2CO_3 + H_2O + RNH_3^+ + RNHCOO^- \leftrightarrow 2RNH_2 + 2NaHCO_3 \quad \text{(Reaction 4)}$$

This approach also utilizes the chemistry of bicarbonate conversion to drive $CO_2$ into the aqueous phase. The sodium bicarbonate ($NaHCO_3$) will disassociate and react to form a mixture of aqueous $CO_2$, $H_2CO_{3(aq)}$, $HCO_3^-$, $CO_3^{2-}$, $Na^+$, $NaHCO_{3(aq)}$, and $Na_2CO_{3(aq)}$ (Reactions 5 and 6) dependent on the ionic strength of solution, total concentration of sodium, total concentration of inorganic carbon, and pH.

$$NaHCO_3 \leftrightarrow Na^+ + HCO_3^- \quad \text{(Reaction 5)}$$

$$H_2O + CO_2 \leftrightarrow H_2CO_3 \leftrightarrow H^+ + HCO_3^- \leftrightarrow 2H^+ + CO_3^{2-} \quad \text{(Reaction 6)}$$

The pH and ionic strength of the solution play a crucial role in the total amount of inorganic carbon that can be dissolved into solution. For example at a pH of 8.25 and a partial pressure of $CO_2$ at 380 ppm (the average pH of sea water under ambient conditions and the concentration of $CO_2$ in the air), deionized water has 3.1 times less total dissolved inorganic carbon (DIC) capacity than the total DIC capacity of sea water (12.53 mg/L and 38.95 mg/L respectively). Dissolved inorganic carbon is the sum of the inorganic carbon species ($CO_2$, $H_2CO_3$, $HCO_3^-$, and $CO_3^{2-}$) written in units of mg of carbon per liter. The dominant carbon species differs at different pH values between deionized water and sea water. The dominant aqueous carbon species of deionized water is $CO_{2(aq)}$ at pH<6.35, $HCO_3^-$ between at pH>6.35 and pH<10.33, and $CO_3^{2-}$ at pH>10.33, while the dominant aqueous carbon species in sea water is $CO_{2(aq)}$ at pH<5.85, $HCO_3^-$ at pH>5.85 and pH<8.92, and $CO_3^{2-}$ at pH>8.92. Carbon concentrations are calculated from solubility products defined by Zeebe and Wolf-Gladrow, $CO_2$ in Seawater: Equilibrium, Kinetics, Isotopes. Elsevier: Amsterdam; N.Y., 2001; p 251-255. By controlling the pH, ionic strength, sodium and initial carbon concentrations, one can create a solution that can both desorb $CO_2$ from a solid sorbent to become carbon enriched and be able to create a $CO_2$ concentration gradient that can be used to deliver $CO_2$ to a receiving reservoir.

In various embodiments of the invention, the sorbent 110 may be a solid made of porous inorganic, polymer with amine functionality (primary, secondary, tertiary or any combination thereof) including ion exchange resins which form quaternary amine salts, or any other material which has a suitable binding energy for the physisorption or chemisorption of $CO_2$. For example, see Youssef Belmabkhout and Abdelhamid Sayari, Adsorption (2009) 15: pp. 318-328 for suitable examples yielding low energy requirements in the combination of Reaction 2 minus Reaction 3.

Cyanobacteria have been shown to utilize aqueous $CO_2$, $HCO_3^-$ and $CO_3^{2-}$ as the source of carbon for photosynthesis (to produce biofuels and other products). Dissolved inorganic carbon (DIC) concentration is defined as the total concentrations (grams carbon/liter) of $CO_2$, $HCO_3^-$, and $CO_3^{2-}$. The form of carbon used by the microalgae is not a critical issue because reactions that interconvert $CO_{2(aq)}$, $H_2CO_3$, $HCO_3^-$ and $CO_3^{2-}$ are sufficiently fast as to not be limiting steps in carbon demand by the photoautotrophs. In the $CO_2$ selective membrane only molecular $CO_2$ will pass through the membrane, i.e., there is no ionic transport that can be measured. When the $CO_2$ transfers to the $CO_2$ lean stream, it will disassociate quickly to another form of inorganic carbon dictated by the pH of the solution. The difference between aqueous concentrations of $CO_2$ on both sides of a membrane must be high enough to ensure $CO_2$ flux across the membrane.

The utilization of this type of chemistry allows for the removal of $CO_2$ from the loaded sorbent 110 under milder conditions than permitted by other options such as high temperature or steam stripping desorption. This approach also utilizes the chemistry of bicarbonate conversion to drive $CO_2$ into the aqueous phase. The sodium bicarbonate can be delivered directly to the photobioreactors where the algae can use it as a carbon source. Although cyanobacteria fix carbon as $CO_2$ by the enzyme RubisCO, most of the carbon that is taken up by the cell can be $HCO_3^-$ (See PCT/EP2009/000892). The solubility of sodium bicarbonate in water (about 1M at room temperature) ensures adequate $CO_2$ delivery to the reactors.

Briefly, a sodium carbonate in water solution 120 (bicarbonate lean) is employed to remove the $CO_2$ from the loaded sorbent 110, thereby converting the carbonate to bicarbonate (Reaction 2). Two concepts are proposed. FIG. 1 illustrates the first process concept. Here a closed system is used for the adsorbent stripping. The loaded sorbent 110 bed is contacted with a sodium carbonate stripping solution 120. The $CO_2$ is removed through the formation of bicarbonate in the water phase. This bicarbonate rich solution 140 is then passed over a $CO_2$ selective dense (non-porous) membrane 150 which is swept with seawater broth (carbonate rich) 160 from the suspension culture 180 in the photobioreactor. Molecular $CO_2$ moves across the $CO_2$ selective dense (non-porous) membrane 150 in response to the driving force provided by the chemical potential gradient across the $CO_2$ selective dense (non-porous) membrane 150 and the bicarbonate rich solution 190 is returned to the suspension culture 180 in the photobioreactor. In order to prevent biofilm formation on the permeation side of the $CO_2$ selective dense (non-porous) membrane 150, the solution 160 removed from the suspension culture 180 is first passed through a micro/ultrafiltration membrane 170 to remove the algae.

The device 130 for contacting the $CO_2$ feed stream 100 with the solid sorbent 110 and washing the $CO_2$ loaded sorbent 110 with the carbonate stripping solution 120, thereby allowing the removal of $CO_2$ from the sorbent 110 and formation of a bicarbonate contacting solution 140, may be designed and constructed utilizing Perry's Chemical Engineers' Handbook, Eighth Edition, ISBN: 0071422943, Authors: Green, Don W. and Perry, Robert H.

In a first aspect, the invention provides a system for delivery of carbon to a photoautotroph. The system comprises a stream containing $CO_2$ 100; a solid sorbent 110 comprising an amine suitable for $CO_2$ capture; a carbonate-based stripping fluid 120; a device 130 for washing the $CO_2$ loaded sorbent 110 with the carbonate stripping solution 120, thereby allowing the removal of $CO_2$ from the sorbent 110 and formation of a bicarbonate contacting solution 140; a $CO_2$ selective dense (non-porous) membrane 150 incorporated into a module allowing transfer of molecular $CO_2$ between the bicarbonate rich contacting fluid 140 and a photoautotroph culture medium 160; and a microfiltration membrane 170 which prevents direct contact between the algae and the bicarbonate contacting solution 140, wherein the photoautotroph culture medium 190 is enriched with bicarbonate providing carbon for algal growth.

In a second aspect, the invention provides a method for delivering carbon to a photoautotroph without altering the ionic content of the culture medium. The method comprises providing a stream 100 containing $CO_2$; passing the $CO_2$ over a solid sorbent 110 comprising an amine suitable for $CO_2$ capture; passing a carbonate-based stripping fluid 120 over the $CO_2$ loaded sorbent 110, thereby allowing the removal of $CO_2$ from the sorbent 110 and formation of a bicarbonate contacting solution 140; utilizing a $CO_2$ selective dense (non-porous) membrane 150 that allows the transfer of molecular $CO_2$ between the bicarbonate rich contacting fluid 140 and a photoautotroph culture medium 160; and utilizing a microfiltration membrane 170 to prevent direct contact between the algae and the bicarbonate contacting solution 140, wherein the photoautotroph culture medium 190 is enriched with bicarbonate providing carbon for photoautotroph growth.

The second concept uses an open system where the $CO_2$ depleted culture Medium 160 is used as the $CO_2$ stripping medium. Here the culture medium 160 is passed through a microfiltration membrane 170, and then fed into the $CO_2$ saturated sorbent 110. This concept is advantageous where volatile products, such as ethanol, have been removed from the reac culture medium 160 as part of the $CO_2$ collection strategy.

The invention described herein may be utilized to provide $CO_2$ to open ponds or closed photobioreactors.

EXAMPLES

The following examples illustrate embodiments of the invention. Example 1 presents options for the $CO_2$ source 100, the sorbent 110 for $CO_2$, the configuration of the contactor/stripping device 130, the composition of the carbonate stripping fluid 120, the $CO_2$ selective dense (non-porous) membrane 150, and the microfiltration membrane 170. Example 2 presents an embodiment wherein the stripping fluid 120 comprises a filtered bicarbonate lean stream 160 from the suspension culture 180 in the photobioreactor or photobioreactors. Example 3 presents working embodiments of $CO_2$ adsorption and desorption and $CO_2$ delivery in support of the invention. Example 4 presents a working embodiment of integrated $CO_2$ adsorption and desorption and $CO_2$ delivery in support of the invention. Example 5 presents a prophetic example of economic modeling.

A total carbon (TC) analyzer (Shimadzu TOC-VCPH) was used to determine dissolved inorganic carbon concentrations in aqueous solutions. An inorganic carbon calibration was performed daily before each measurement using carbon standard solutions. A quadrupole mass spectrometer (Pfeiffer Vacuum OminStar™ Gas Analysis System) was used to determine the gas concentrations during the carbon dioxide sorption studies. A Mettler Toledo pH meter was used to measure the pH of the aqueous solutions in real time, while peristaltic pumps were used to circulate the aqueous solutions.

All chemicals used in experiments were ACS grade or better. Water used in the experiments was deionized (>15 M$\Omega$·cm) using a Millipore Elix. Sylgard® 184 Silicone Elastomer Base and Curing Agent were used to synthesize the polydimethylsiloxane (PDMS) membranes. The 3-aminopropyltriethoxysilane (APTES) functionalized glass beads (30-50 μm) were purchased from Polyscience, Inc. (Cat#23584) and used as the $CO_2$ sorbent. Synthetic sea water was made by mixing Instant Ocean® salts with deionized water to simulate photobioreactor broths.

Example 1

Regeneration of a $CO_2$ Loaded Adsorber with Carbonate Solution Using a $CO_2$-Selective Dense (Non-Porous) Membrane System The source 100 of $CO_2$ may be air, flue gas from power plants or industrial sources, or natural gas treating.

The sorbent 110 may be a solid made of: porous inorganic, polymer with amine functionality (primary, secondary, tertiary or any combination) including ion exchange resins which form quaternary amine salts, or any other material which has a suitable binding energy for the physisoiption or chemisorption of $CO_2$. These are well known in the art.

The contactor/stripping device 130 configuration may be a packed bed with low pressure drop sorbent 110 particles which may be mixed with inorganic components to increase porosity and limit pressure drop, a honeycomb monolithic ceramic supporting a suitable $CO_2$ adsorbent, or an inorganic-organic hybrid or polymer based fiber contactor made of functionalized amine, amine rich polymer or polymer loaded with ion exchange resin. These are well known in the art. $CO_2$ sorbent systems that are consistent with the extraction of $CO_2$ via carbonate contacting fluid may be selected to design the sorbent module in a manner which optimizes the stripping process described below.

The stripping solution 120 may be an aqueous carbonate preferentially sodium, but also potassium. The concentration of the stripping solution 120 may range from 0.01 to 0.55M (1 mole goes to 2 moles of bicarbonate which has solubility limit of 1.19M in water). The stripping solution 120 may also contain other salts and metals such as found in seawater.

The contactor/stripping device 130 is designed to allow the loaded sorbent 110 to be washed with stripping solution 120. The contactor/stripping device 130 will also allow for the heating of the stripping solution 120 in the range of 10 to 50 degrees Celsius above ambient temperature. The contactor/stripping device 130 will include a means for delivery of the stripping solution 120 such that the solution may have a residence time in the contactor/stripping device 130 from 30 seconds to 30 minutes. The stripping solution 120 will be converted from carbonate rich to bicarbonate rich and leave the regenerated sorbent 110 as a contacting solution 140 with a bicarbonate concentration from 0.02 to 1.1 M with the balance of the carbonate from the lean solution 120 being un-reacted carbonate.

In an embodiment wherein photoautotrophs are present in a suspension culture 180 in a photobioreactor or photobioreactors, the $CO_2$ selective dense (non-porous) membrane 150 takes a flow of the bicarbonate rich solution 140 on one side (retentate) and is swept with filtered culture fluid 160 (carbonate rich) from the photobioreactors on the other side (permeate). Such a system is not known in the art. The carbonate chemistry in water allows photoautotrophs to deplete the $CO_2$ concentration through the consumption of $CO_2$ and $HCO_3^-$. The driving force for $CO_2$ transport across the $CO_2$ selective dense (non-porous) membrane 150 is the chemical potential gradient moving toward the carbonate/bicarbonate equilibrium of the two fluids that is caused by the consumption of $CO_2$ by the photoautotrophs to form ethanol, biomass or other products. The $CO_2$ selective dense (non-porous) membrane 150 may be composed of a non-porous rubbery polymer such as polydimethylsiloxane or a glassy polymer chosen from a number of families with operating pore sizes smaller than the size of a hydrated sodium cation or a hydrated carbonate or bicarbonate anion, such as cellulose acetate, polyimides or polyether sulfones, or the membrane may be of layered construction containing polymers of any or all of the classes mentioned above. The $CO_2$ permeability of the $CO_2$ selective dense (non-porous) membrane 150 may be in the range of 100-10,000 Barrer. In some embodiments, the $CO_2$ selective dense (non-porous) membrane 150 is polydimethylsiloxane (PDMS) with a $CO_2$ permeability of 3800 Barrer ($1.27 \times 10^{-12}$ mol/m-s-Pa) at 35° C. In this device, $CO_2$ moves across the $CO_2$ selective dense (non-porous) membrane 150 converting the bicarbonate lean solution 160 from the photobioreactor to a bicarbonate rich solution 190, which is then returned to the bioreactor.

The microfiltration membrane 170 filters the photoautotrophs from the culture in order to prevent biofilm formation on the permeation side of the $CO_2$ selective dense (non-porous) membrane 150 (due to the high concentration of bioavailable $CO_2$). The culture medium 160 removed from the reactor is first passed through a micro/ultrafiltration membrane 170 to remove the photoautotrophs. The micro/ultrafiltration membrane 170 must have an effective pore size in the range of 0.05-5 µm and may be chosen from any number of commercially available microfiltration membranes made from ceramic or polymeric materials, which are all well known in the art.

Example 2

Figure 2:
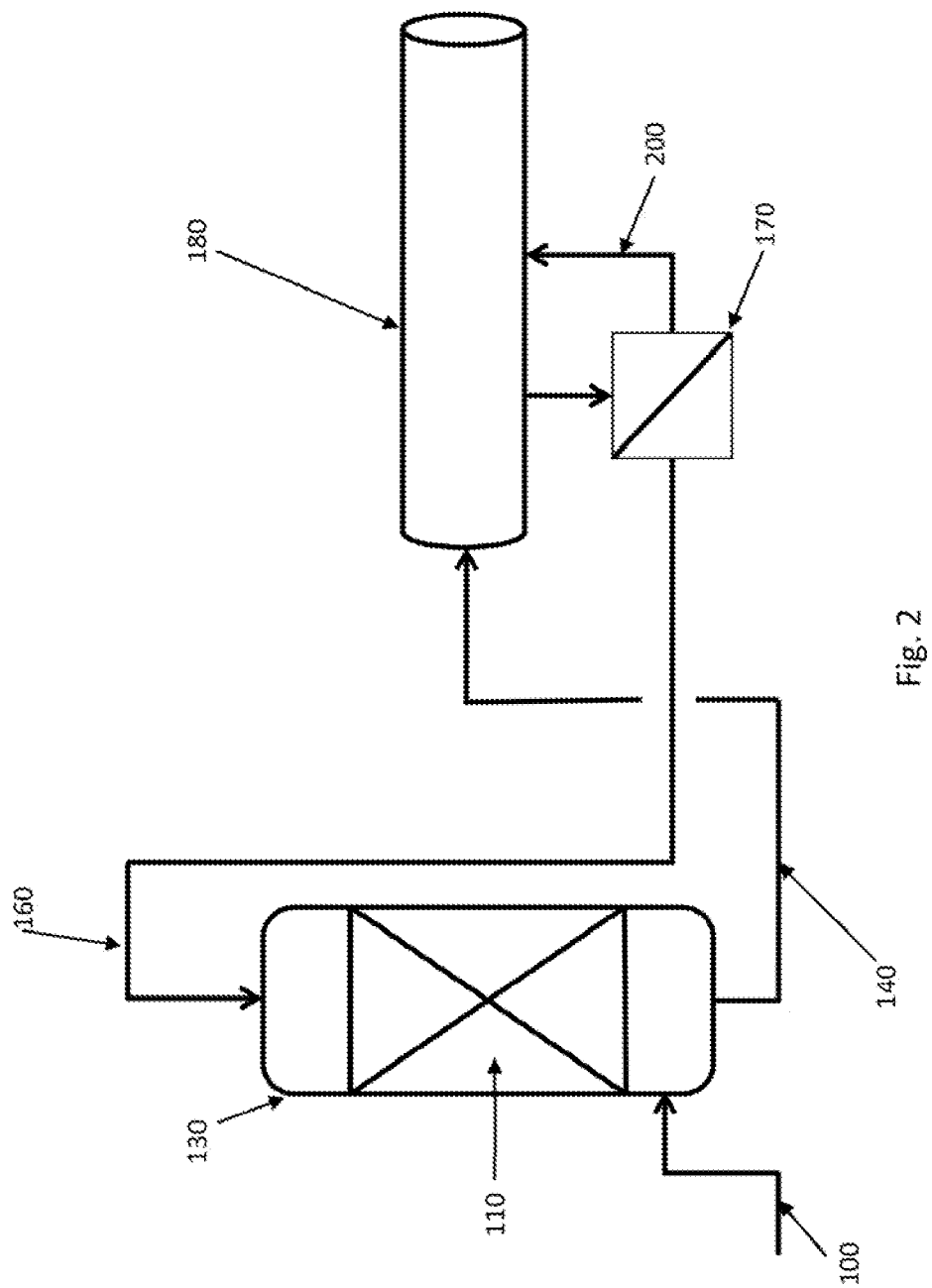
FIG. 2 is a schematic of a system without the $CO_2$ selective membrane (Example 2).

Regeneration of $CO_2$ Loaded Adsorber Using a Stripping Solution Comprising a Bicarbonate Lean Broth from Reactor as Stripping Solution As illustrated in FIG. 2, this example uses the same elements of Example 1 but comprises a filtered bicarbonate lean stream 160 from the photobioreactors as the stripping solution 120. The same concentration ranges apply and same microfiltration membrane 170 would be used.

Example 3

Figure 3:
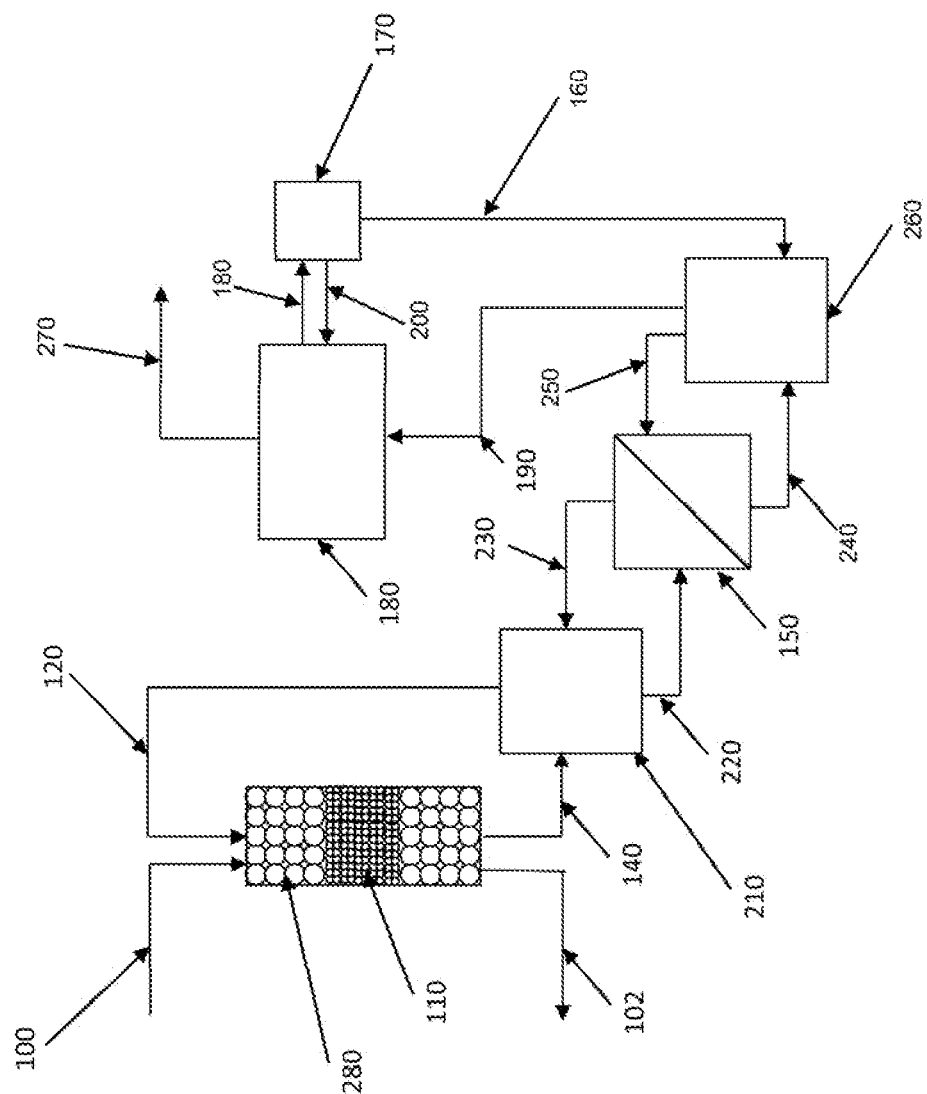
FIG. 3 shows a schematic diagram and carbon streams of the overall process in which a first operational mode of the adsorption column (1) is sorption of $CO_2$ from a flue gas feed stream and a second operational mode (2) is the desorption of $CO_2$ from the sorbent.

Demonstration of a $CO_2$ Desorption from a $CO_2$ Loaded Sorbent Using a Carbonate Solution and $CO_2$ Transfer Between Aqueous Solutions Using a $CO_2$ Selective Dense (Non Porous) Polymer Membrane In the $CO_2$ adsorption column illustrated in FIG. 3, $CO_2$ from the feed stream 100, in this case a $CO_2$ rich flue gas, is adsorbed by the sorbent 110 and exits as a $CO_2$ stripped flue gas 102. The $CO_2$ is desorbed from the solid sorbent 110 by a water carbonate stream 120 in which the sodium carbonate ($Na_2CO_3$) reacts with the surface and removes complexed $CO_2$ held as $RNHCOO^-$ to form sodium bicarbonate consistent with Reaction 2. The sodium bicarbonate reacts to a dissolved inorganic form and becomes enriched in dissolved inorganic carbon. The contacting solution 140 is delivered to a water carbonate reservoir 210. After some time an enriched carbon stream 220 is pumped in contact with the $CO_2$ selective dense (non-porous) membrane 150 into which aqueous $CO_2$ dissolves. The membrane retentate 230 has less $CO_2$ corresponding to a lower DIC concentration than the enriched carbon stream 220. The membrane permeate 240 is enriched in $CO_2$ corresponding to a higher DIC concentration than a feed stream 250 from a receiving solution reservoir 260. After some time, the receiving solution reservoir 260 reaches a DIC concentration usable by microorganisms in the photobioreactor (PBR). The PBR feed 190 contains carbon that is consumed to make ethanol or other biofuels. A biofuel stream 270 is removed from the PBR and processed further. The PBR algal broth 180 is then pumped through a filter (a micro- or ultrafiltration membrane 170) in which a return stream 200 is enriched in biosolids and returned back to the suspension culture 180 while a biosolids free stream 160 is returned to the receiving solution reservoir 260 to be enriched in carbon via contact with the $CO_2$ selective dense (non-porous) membrane 150. Key aspects of this example are the transfer of molecular $CO_2$ across the $CO_2$ selective dense (non-porous) membrane 150 from the water carbonate solution reservoir 210 to the receiving solution reservoir 260, the lack of any ionic transport across the $CO_2$ selective dense (non-porous) membrane 150 and the regeneration of the solid $CO_2$ sorbent 110 using viable stripping solutions 120.

Sorbing $CO_2$ onto Absorbent

Figure 4:
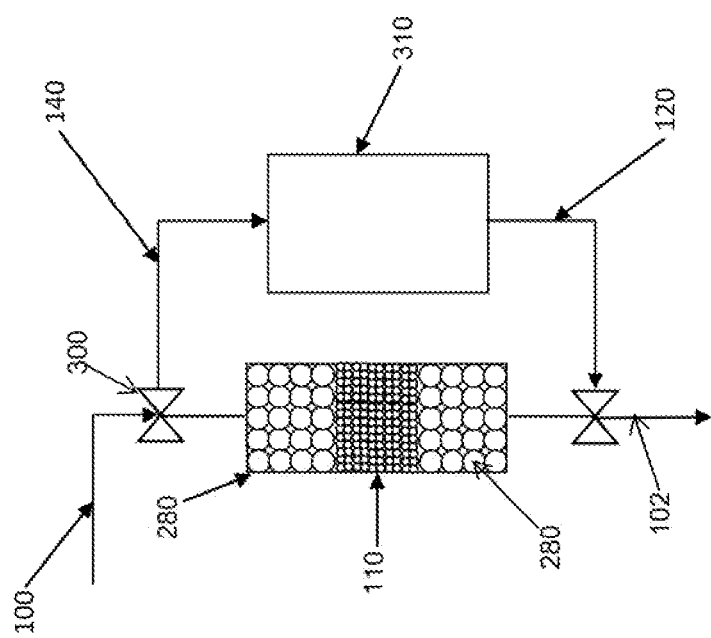
FIG. 4 gives details of an experiment for carbonate stripping.

A packed bed column with a 3-Aminopropyltriethoxysilane (APTES) sorbent 110 was used to remove $CO_2$ from a $CO_2/N_2$ gaseous stream 100. The loaded sorbent 110 was then stripped with an aqueous solution 120 to assess the viability of desorbing $CO_2$ from the sorbent 110 using an aqueous solution 120. A conceptual diagram of the setup is illustrated in FIG. 4. A 7 mL column was first filled with 1.31 g of 3 mm of glass beads 280. Then 1 g of the amine grafted glass bead sorbent 110 purchased from Polyscience, Inc. was placed into the column, then additional 1.73 g of 3 mm glass beads 280 was packed on top of the sorbent 110. Column frits (10 µm filters) at the top and bottom of the column prevent the movement of glass beads 280 and sorbent 110. No $CO_2$ sorption was shown to occur onto the 3 mm glass beads 280. A 12.5% mol/mol $CO_2$ (the rest $N_2$) stream 100 was fed into the column at a rate of 0.05 SCFH (22.39 mL/min).

Figure 5:
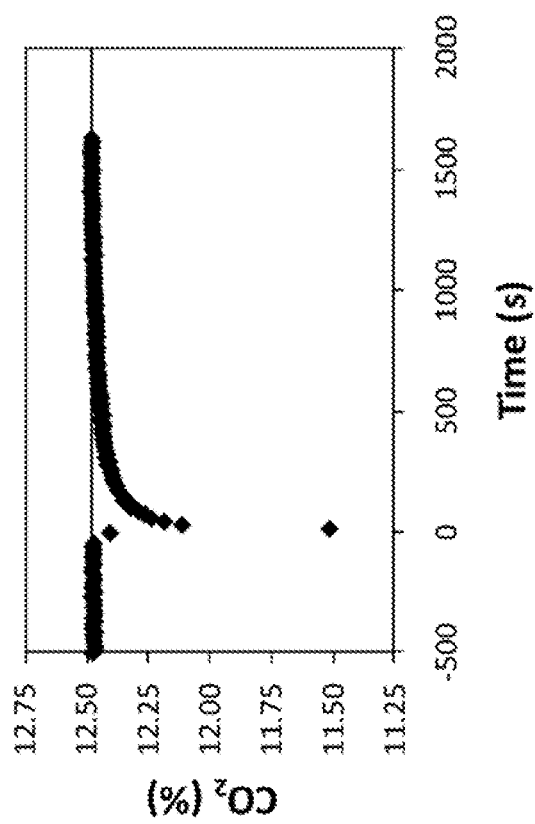
FIG. 5 gives the gas phase analysis demonstrating $CO_2$ capture with an APTES sorbent and quantifies the amount of $CO_2$ on sorbent to be stripped by carbonate solution.

The amount of $CO_2$ in the exit stream 102 was measured as a function of a time and the amount of $CO_2$ adsorbed was calculated using a breakthrough curve (FIG. 5). The adsorption of $CO_2$ to the amine occurred within ten minutes. The average sorption capacity of the sorbent 110 was determined to be 1.024 mg $CO_2$ as C/g of sorbent based on single adsorption/regeneration cycles. The working adsorption capacity therefore would be less than 1.0 mg $CO_2$ as C/g sorbent 110.

Figure 6:
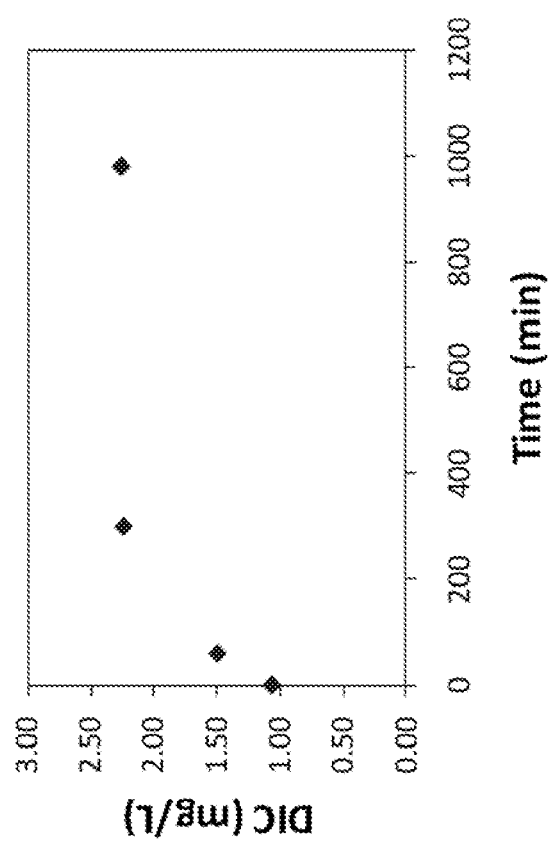
FIG. 6 gives the dissolved inorganic carbon (DIC) concentration of the aqueous solution as a function of time during the packed bed desorption experiment.

Valves 300 were then changed to allow an aqueous solution 120 to pass over the sorbent 110 to desorb the sorbed $CO_2$. The aqueous solution 120 was prepared in a Tedlar® bag by weighing out 0.115 g NaOH and pumping in 115 mL of deionized water to eliminate $CO_2$ transfer to the solution 120 similar to the preparation in the liquid/liquid membrane experiment. The solution 120 was well mixed using a stir bar in the Tedlar® bag and 15 mL of solution was used to determine the initial pH and DIC concentrations giving a final water reservoir volume of 100 mL. The initial pH of the solution 120 was 12.51 and the initial dissolved inorganic carbon (DIC) concentration was 1.073 mg/L. The initial DIC concentration in solution was attributed to $CO_2$ transfer from the air to the water before the water was pumped into the Tedlar® bags. The aqueous solution 120 was pumped from the bottom of the column to top at a rate of 2 mL/min and returned back to the water reservoir 310. The change in DIC concentration of the aqueous solution 120 increased as a function of time (FIG. 6) with a final DIC concentration of 2.26 mg/L. The amount of $CO_2$ desorbed from the sorbent was 0.126 mg as C which corresponds to 80.8% of the total sorbed $CO_2$.

Desorbing $CO_2$ into Stripping Solution

The effect of pH on the effective equilibrium of the elutriation of $CO_2$ was examined. A mass balance on the amount of carbon uptake in the solution 120 was used to calculate the total amount desorbed from the APTES sorbent 110 (Table 1). The results indicated that at higher pH values more $CO_2$ can be desorbed from the APTES sorbent 110. However, at higher pH values the stripping solution 120 has less of a $CO_2$ driving force to promote the transfer of $CO_2$ across the $CO_2$ selective dense (non-porous) membrane 150.

TABLE 1

The percentage of carbon dioxide desorbed from the sorbent 110 under different initial conditions.

| pH | DIC (mg/L) | |
| --- | --- | --- |
| | 1.0 | 35 |
| 7 | 19.4% | 20.9% |
| 8.25 | | 52.1% |
| Seawater 8.25 | | 57.4% |
| 10 | 55.3% | 50.9% |
| 12 | 80.8% | 59.4% |

Figure 7:
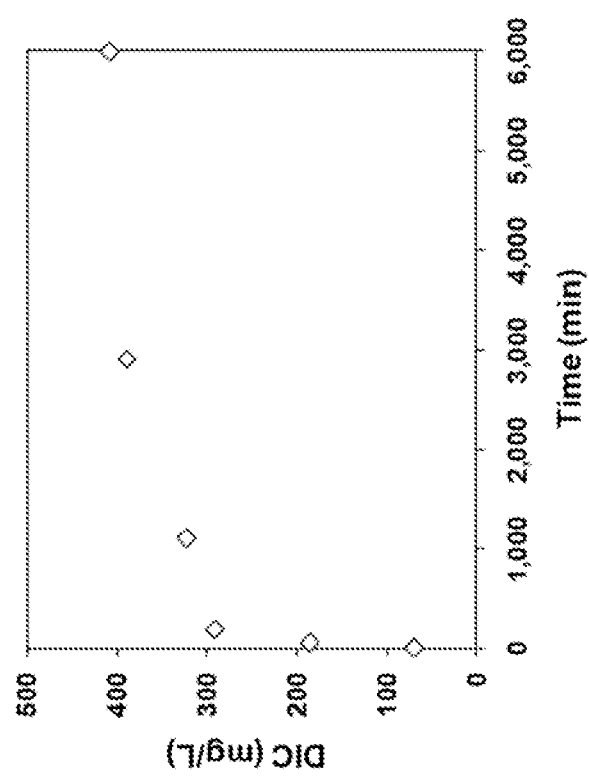
FIG. 7 gives the dissolved inorganic carbon (DIC) concentration in the $CO_2$ lean stream as a function a time which indicates $CO_2$ flux across the PDMS membrane.
Figure 8:
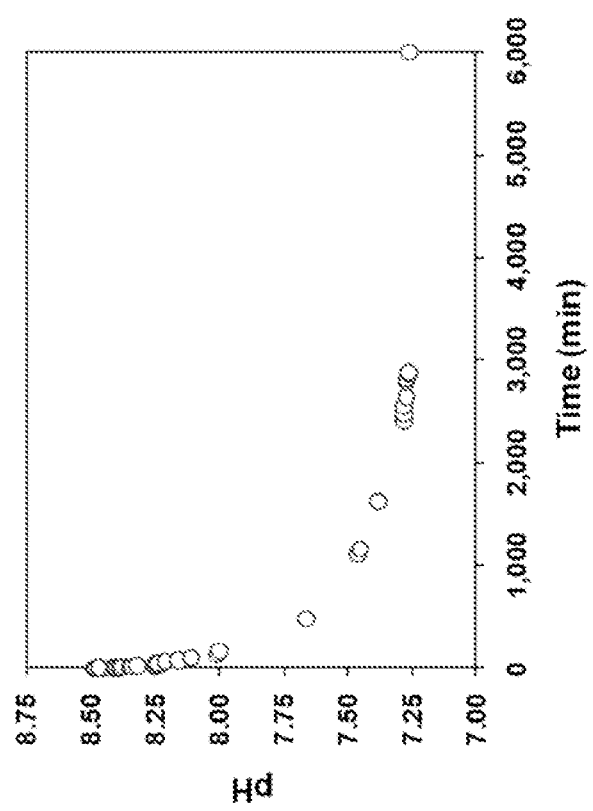
FIG. 8 gives real time pH measurements as a function of time in the $CO_2$ lean stream as a function a time indicating $CO_2$ flux across the PDMS membrane.

The initial concentration of the bicarbonate solution 140 was 12.067 mg as C/L (=12.067 DIC/liter) and the aqueous $CO_2$ concentration was $1.91 \times 10^{-2}$ M with an initial pH was 8.06. The initial concentration of $CO_2$ poor solution 120 was 70.0 mg as C/L and the aqueous $CO_2$ concentration was $4.14 \times 10^{-5}$ M with an initial pH of 8.38. Since the aqueous $CO_2$ concentration was greater in the bicarbonate solution 140, there was a driving force for $CO_2$ flux across the $CO_2$ selective dense (non-porous) membrane 150. The DIC concentration in the $CO_2$ poor solution 120 increased with time (FIG. 7) indicating $CO_2$ flux across the $CO_2$ selective dense (non-porous) membrane 150. The pH of the $CO_2$ poor solution 120 decreased with time (FIG. 8). The pH change was due to the acidification of the solution 120 with the addition of $CO_2$ and was used as an indirect indicator of $CO_2$ transfer in systems. The initial flux of $CO_2$ across the $CO_2$ selective dense (non-porous) membrane 150 was $3.55 \times 10^{-6}$ kg/s m$^2$ and the total amount of $CO_2$ transferred in this process was 135.4 mg as C.

Figure 9B:
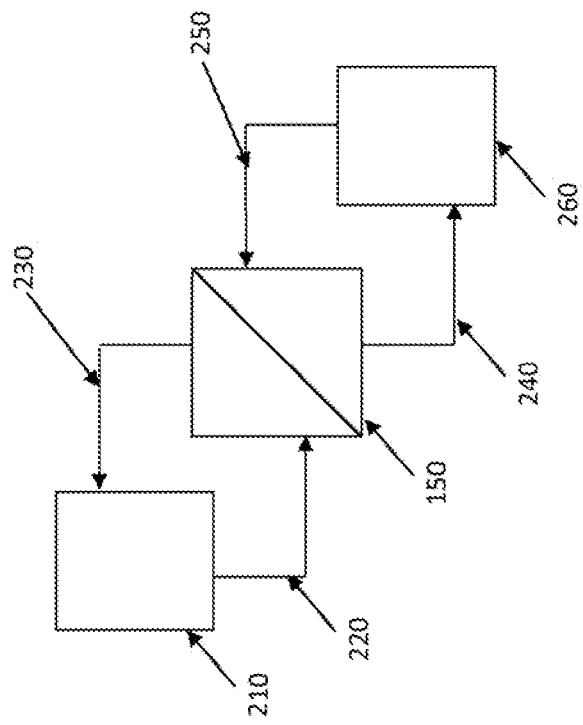
FIGS. 9A and B illustrate A) a membrane contactor design in which the membrane is supported by two porous metal supports, and B) the experimental set up of a liquid/liquid membrane contactor.
Figure 9A:
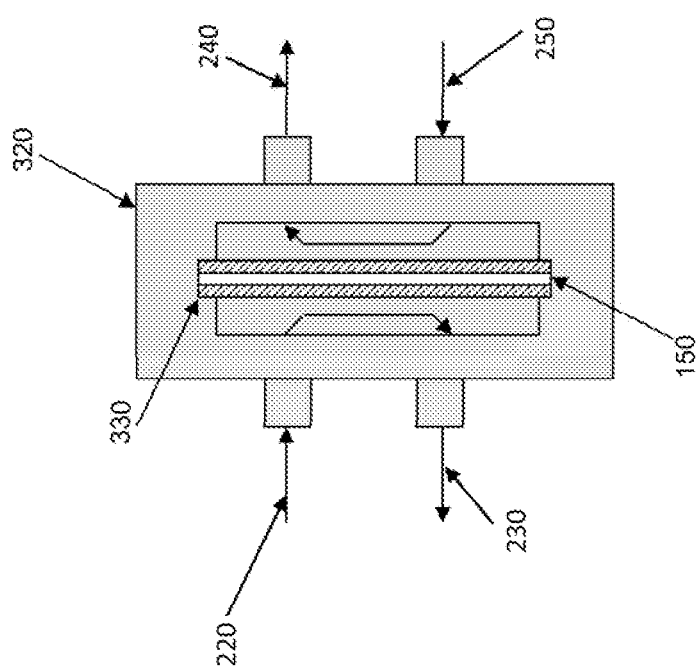

$CO_2$ Transfer Between Aqueous Solutions Using a $CO_2$ Selective Dense (Non-Porous) Polymer Membrane A liquid/membrane/liquid contactor experiment was used to determine the viability of using a $CO_2$ selective dense (non-porous) polydimethylsiloxane (PDMS) membrane 150 to transfer aqueous $CO_2$ from a bicarbonate ($CO_2$ rich) aqueous solution 140 to a $CO_2$ poor receiving solution 160. The PDMS membrane 150 was supported inside the membrane contactor 320 by two highly porous (2 mm pores) metal supports 330 (0.7 mm thick) (FIG. 9A). A conceptual diagram of the setup is illustrated in FIG. 9B.

The PDMS membrane 150 (92 μm thick) was synthesized by first weighing out 9:1 wt/wt ratio of silicone elastomer base to curing agent and dissolving in heptane to make a 20% wt/wt solution of PDMS in heptane. The solution of 20% wt/wt PDMS in heptane was then pipetted onto a Teflon® plate and placed in a vacuum oven at 80° C. for two hours. After boiling off the heptane, the PDMS film was left to cool at room temperature before removing the film 150 and placed into a permeation cell to determine gas permeability and selectivity. The permeability [Barrer=$10^{-10}$ cm$^3$(STP)·cm/cm$^2$·s·cmHg)] of the PDMS film 150 was measured with pure gases at 22° C. ($CO_2$=2170, $O_2$=398, $N_2$=206 Barrer). The gas selectivities were then calculated from the permeabilities ($\alpha O_2/N_2$=1.9, $\alpha CO_2/O_2$=5.5, $\alpha CO_2/N_2$=10.5), and confirmed the formation of a PDMS membrane 150.

The upstream bicarbonate aqueous solution 220 was a 1M NaHCO$_3$ solution pumped into contact with the membrane contactor 320. The downstream $CO_2$ poor solution 250 contained a low dissolved inorganic carbon (DIC) concentration of approximately 35 mg/L DIC, simulating the amount of dissolved inorganic carbon (DIC) found in a photobioreactor solution. A pH probe was placed in the $CO_2$ poor solution 250 to monitor the change in pH caused by the uptake of $CO_2$ into solution 250. At periodic intervals the bicarbonate aqueous solution 220 and the downstream $CO_2$ poor solution 250 were sampled through the septum valves using a syringe to determine the dissolved inorganic carbon (DIC) concentration using a total organic carbon (TC) analyzer (Shimadzu TOC-VCPH). Sodium concentration was measured with a sodium ion probe in each grab sample. No sodium was observed to transfer across the PDMS membrane 150, confirming that the PDMS membrane was a dense (non-porous) membrane.

The containers for the bicarbonate aqueous solution 220 and the downstream $CO_2$ poor solution 250 were 1 L Tedlar® bags with two polypropylene 2-in-1 valves with a septum valve and a ⅛" fitting. The Tedlar® bags were used to eliminate $CO_2$ transfer between the atmosphere and the solution. The bicarbonate aqueous solution 220 and the downstream $CO_2$ poor solution 250 were made by weighing out the appropriate amount of sodium bicarbonate, NaHCO$_3$, (Solution 1=33.604 g and Solution 2=0.1960 g) then with the Tedlar® bag closed air was removed from each bag using the septum valves. Finally, 500 mL of deionized water were pumped into each Tedlar® bag to minimize the amount of gas in each bag. Each aqueous solution was well mixed using stir bars in each Tedlar® bag. Afterwards 100 mL of the solution 220 and 250 were pumped out of each bag and used for initial measurements, leaving a final volume of 400 in L in each bag.

During the experiment the bicarbonate aqueous solution 220 and the downstream $CO_2$ poor solution 250 were pumped at a flow rate of 2, 10 or 20 mL/min to investigate the effect of flow rate and examine the impact of external mass transfer resistances within the membrane contactor 320. The flows of the bicarbonate aqueous solution 220 and the downstream $CO_2$ poor solution 250 were countercurrent and the flowrates were equal in magnitude.

Even though the difference between DIC concentrations of the bicarbonate aqueous solution 220 and the downstream $CO_2$ poor solution 250 remained large throughout the experiment (FIG. 10A), the DIC concentration in the $CO_2$ lean solution 250 reached a steady state concentration. The difference between the aqueous $CO_2$ concentration of the bicarbonate aqueous solution 220 and the downstream $CO_2$ poor solution 250 became small (FIG. 10B) minimizing the concentration driving force between the two solutions. It is important to consider the difference in aqueous $CO_2$ concentrations when optimizing this process to other systems which allows the system to be flexible and may not require such a carbonate loaded stream in other processes. For example, to maintain the initial $CO_2$ flux in the experiment stated above, a DIC concentration of 12,000 mg/L was needed at pH of 8.0 but lower DIC concentrations would be needed at lower pH values (1430 mg/L and 273 mg/L of DIC at pH values 7.0 and 5.0 respectively). Operational pH values of the bicarbonate aqueous solution 220 will be dependent on the sorbent 110 type. The desired pH value could be as low as the sorbent 110 can maintain its structural integrity but will lie within the pH range of 5.0 to 8.2. Bicarbonate aqueous solution 220 with a pH greater than 8.2 with the desired $CO_2$ flux will have problems with the precipitating out of solids. The operational DIC concentrations of the $CO_2$ lean stream 250 can vary from 0.31 mg/L (0.03 mM) to 3000 mg/L (250 mM) while the operational pH values of the $CO_2$ lean stream 250 could vary from 7.0 to 9.0. A high $CO_2$ flux across the membrane 150 is desired to minimize membrane area and to meet $CO_2$ delivery demand. In general to achieve a high $CO_2$ flux, a high pH (>8.0) and a low DIC (<70 mg/L) would be desired on the $CO_2$ lean stream 250 while a low pH (<7.5) and a high DIC would be desired on the bicarbonate aqueous solution 220. The monitoring of aqueous $CO_2$ concentration in each stream is desired to ensure that the concentration in the bicarbonate aqueous solution 220 is greater than the $CO_2$ lean stream 250 at all times, and can be accomplished by imbedded pH probes to provide real time pH readings, syringe pumps with a desired base (e.g. sodium hydroxide) or a desired acid (e.g. hydrochloric acid), and a direct measure of DIC using a TOC analyzer, infrared spectrometer, or Raman spectrometer.

Figure 11:
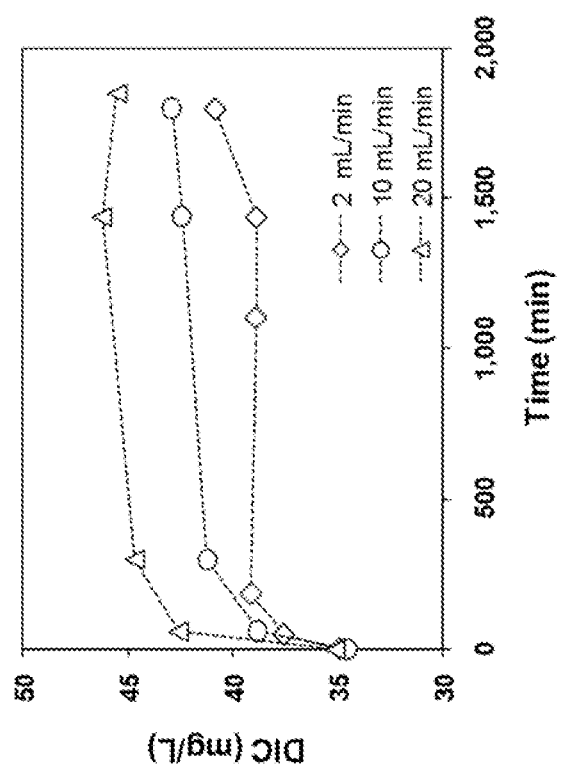
FIG. 11 shows dissolved inorganic carbon (DIC) concentration in the receiving solution as a function a time at different flow rates.
Figure 12:
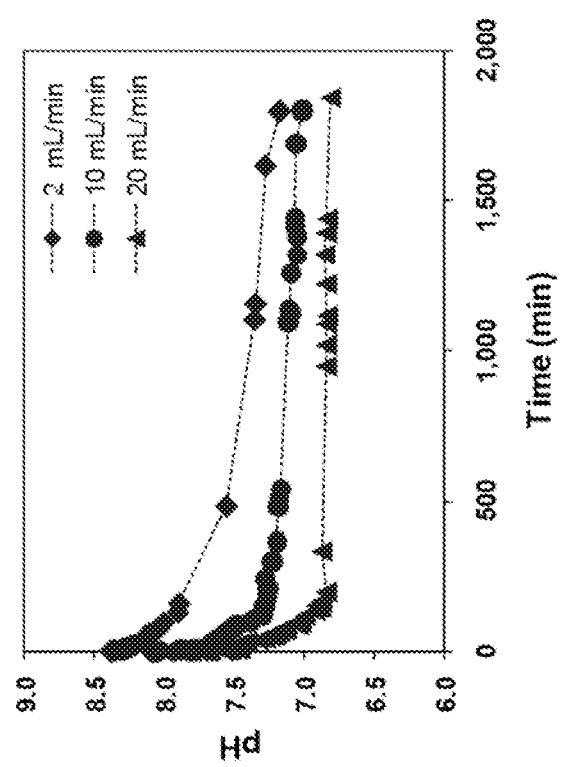
FIG. 12 shows real time pH measurements as a function of time in a receiving solution as a function of flow rate.

The initial DIC concentration of each of the $CO_2$ poor solutions 250 were essentially the same—34.9, 34.6, and 35.1 mg/L—for the flow rates of 2, 10, 20 ml/min, respectively (FIG. 11). The final DIC concentration for each flow rate condition of the $CO_2$ poor solutions 250 was 40.8, 42.9, and 45.5 mg/L for 2, 10, and 20 mL/min respectively after 30 hours of operation. The pH decreased in the $CO_2$ poor solution 250 due to the uptake of $CO_2$ (FIG. 12).

The DIC and pH for all three flow rates would eventually approach the same value. The difference observed at the 2,000 minute mark was due to the time response which was a function of the flow rate and the mass transfer resistances in the membrane contactor 320. (Experiments run to 80 hours, not shown, revealed a close approach of the DIC and pH values for a 2 ml/min flow rate to those for a 20 ml/min flow rate).

Figure 13:
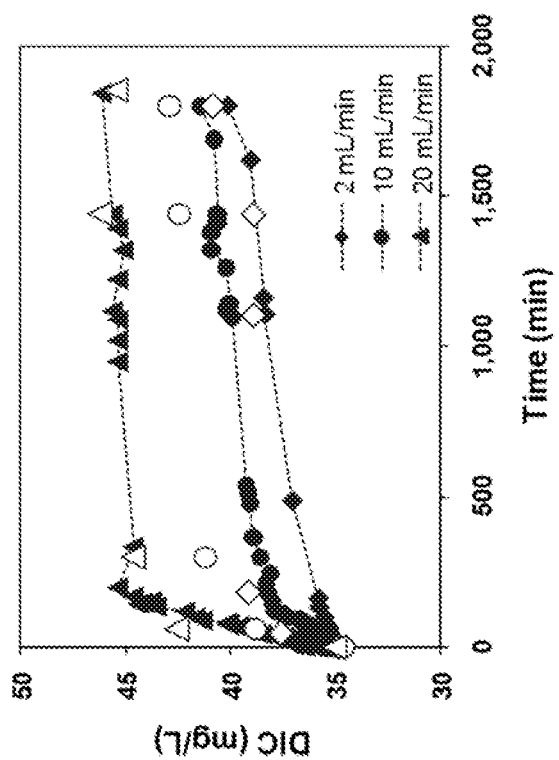
FIG. 13 shows a comparison of TOC analyzer measured dissolved inorganic carbon (DIC) concentration (open symbols) and pH derived DIC (closed symbols) in a receiving solution at the three flow rates.

The observed change in pH in the $CO_2$ poor solution 250 decreased to an approximate value of 0.002 pH units per hour and steadily decreased due to the decrease in the driving force. The increase in DIC concentration in the $CO_2$ poor solution 250 as indicated by the change in pH correlated with the grab samples measured by the TC analyzer (39.6, 41.4, and 46.1 mg/L for 2, 10, and 20 mL/min respectively). A comparison of the two measures is shown in FIG. 13.

The lingering differences in DIC concentrations at long tunes indicated significant external mass transfer resistances in the membrane contactor 320. In the absence of external mass transfer resistance, all three curves in FIG. 13 would superimpose at all time scales, the changes with time reflecting the decrease in driving force across the membrane 150 in "batch" experiments. External mass transfer resistance is reduced by, for example, increasing flow rates of the fluid streams 220 and 250 across the surfaces of the $CO_2$ selective dense (non-porous) membrane 150 and/or incorporating baffles on the surfaces of the membrane 150.

In each case studied, the DIC concentration in the $CO_2$ poor solution 250 rapidly increased but leveled off approaching an asymptotic value. The rate of change continually decreased due to the decrease in driving force. This indicated that even though there still was a significant difference in the amount of DIC in each reservoir ($\approx$1 to $3.5 \times 10^{-3}$ M in the upstream and downstream reservoirs respectively) the $CO_2$ driving force across the membrane 150 decreased substantially over time.

The change in the $CO_2$ chemical potential on both sides of the membrane contactor 320 was investigated. The effective concentrations or activities ($\alpha_i$) of dissolved species are defined as:

$$\alpha_i = \gamma_i m_i / m^\circ \quad \text{(Equation 1)}$$

where $\gamma_i$ is the activity coefficient and $m_i$ is the molal concentration of species i. The standard state of molality ($m^\circ$) is 1 mol/kg so that Equation 1 can be rewritten as $\alpha_i = \gamma_i m_i$. The chemical potential ($\mu_i$) of individual dissolved species is:

$$\mu_i = \mu_i^\circ + RT \ln \alpha_i \quad \text{(Equation 2)}$$

where $\mu_i^\circ$ is the chemical potential of the species at a reference condition. The ionic strength (I) of the solution is defined as:

$$I = \frac{1}{2} \sum (m_i z_i) \quad \text{(Equation 3)}$$

where $z_i$ is the charge of species i. The activity coefficient ($\gamma_i$) is a strongly dependent on ionic strength (I), which is dependent on the concentration of anions and cations. Other factors that affect the activity coefficient include temperature, density of water, dielectric constant of water, and effective size of hydrated ions. The Debye-Huckel equation (Reaction 10) was used to solve for the activity coefficients of charged dissolved aquatic species.

$$\log \gamma_i = \frac{-A z_i^2 \sqrt{I}}{1 + B a_i \sqrt{I}} \quad \text{(Equation 4)}$$

where $A = 1.824928 \times 10^6 \rho_o^{1/2} (\epsilon T)^{-3/2}$ and $B = 50.3 (\epsilon T)^{-1/2}$, $\rho_o$ is the density of water, $\epsilon$ is the dielectric constant of water, $z_i$ is temperature in Kelvin, is the ionic charge of species i, and $\alpha_i$ is the ion size parameter of species i. Activity coefficients for uncharged, molecular species obey the empirical Setchenow equation up to high ionic strengths and generally include dissolved gases, weak acids, and molecular organic species. The Setchenow equation (Equation 5) is:

$$\log \gamma_i = K_i I \quad \text{(Equation 5)}$$

A 20 mL/min the $CO_2$ poor solution 250 initially had an ionic strength of $2.94 \times 10^{-3}$ mol/kg yielding an activity coefficient of $CO_2$ ($\gamma_{CO2,D}$) of 0.9984 and a molar concentration of $CO_2$ equal to $3.12 \times 10^{-5}$ M and a $CO_2$ activity ($\alpha_{CO2,D}$) of $3.115 \times 10^{-5}$. For the $CO_2$ poor solution 250 at the final sample point (DIC=46 mg/L), the ionic strength was $2.917 \times 10^{-3}$ mol/kg yielding an activity coefficient of $CO_2$ ($\gamma_{CO2,D}$) of 0.9984 and a molar concentration of $CO_2$ equal to $9.11 \times 10^{-4}$ M or a $CO_2$ activity ($\alpha_{CO2,D}$)$_D$ of $9.095 \times 10^{-4}$.

Similarly, for the bicarbonate aqueous solution 220 the initial (t=0) ionic strength was 0.707 mol/kg, the $\gamma_{CO2,U}$= 0.6866, $\alpha_{CO2,D}$=$1.69 \times 10^{-2}$ and initial $CO_2$ concentration=$2.46 \times 10^{-2}$ M. For the bicarbonate aqueous solution 220 for the final data point the following were calculated for a $CO_2$ concentration of $2.41 \times 10^{-2}$ M, $\gamma_{CO2,U}$=0.6861 and the $\alpha_{CO2,D}$=$1.47 \times 10^{-2}$. From the calculated $CO_2$ activities, the chemical potential of $CO_2$ in both the bicarbonate aqueous solution 220 and $CO_2$ poor solution 250 are described as:

$$\mu_{CO2}^U = \mu_{CO2}^\circ + RT \ln \alpha_{CO2,U} \quad \text{(Equation 6)}$$

$$\mu_{CO2}^D = \mu_{CO2}^\circ + RT \ln \alpha_{CO2,D} \quad \text{(Equation 7)}$$

The difference between the bicarbonate aqueous solution 220 and $CO_2$ poor solution 250 chemical potentials is:

$$\Delta \mu_{CO2} = \quad \text{(Equation 8)}$$
$$\mu_{CO2}^U - \mu_{CO2}^D = \mu_{CO2}^\circ + RT\ln\alpha_{CO2,U} - \mu_{CO2}^\circ - RT\ln\alpha_{CO2,D}$$

$$\Delta \mu_{CO2} = RT \ln \frac{\alpha_{CO2,U}}{\alpha_{CO2,D}} \quad \text{(Equation 9)}$$

Equation 9 describes the driving force at initial conditions assuming a perfectly mixed solution. Initially the ratio of the bicarbonate aqueous solution 220 to $CO_2$ poor solution 250 activity was $$\frac{\alpha_{CO2,U}}{\alpha_{CO2,D}} = 540$$

while after 24 hours the ratio of the bicarbonate aqueous solution 220 to $CO_2$ poor solution 250 activity decreased to $$\frac{\alpha_{CO2,U}}{\alpha_{CO2,D}} = 16.$$

As can be seen the initial activity of $CO_2$ in the bicarbonate aqueous solution 220 was 540 times greater than the activity of $CO_2$ in the $CO_2$ poor solution 250. As the experiment progressed the initial activity of $CO_2$ in the bicarbonate aqueous solution 220 decreased to be 16 times greater than the activity of $CO_2$ in the $CO_2$ poor solution 250. This was a 97% decrease in driving force which explained, to a large degree, the decrease in $CO_2$ flux across the membrane 150 and indicated that only $CO_2$ crossed the membrane, which was confirmed by the absence of sodium ion transport during the experiment.

An important design parameter, relevant to potential for process scale up and commercial deployment, is the $CO_2$ permeance of the membrane 150. In the case of the fastest flow rate (20 mL/min) there was a change in DIC concentration of 0.25 mg/L within the first 15 seconds, which resulted in an initial $CO_2$ flux of 0.134 mmol/m²sec and a permeance of about 5 GPU [GPU=$10^{-6}$ cm³ (STP)/(cm²-s-cmHg)]. In comparison to the expected permeance of 24 GPU determined from gas transport measurements on the same PDMS films, i.e., without liquid mass transfer resistances, the impact of the external mass transfer resistance was about a factor of five reduction in $CO_2$ flux. The magnitude of this effect is consistent with the observations illustrated in FIGS. 11, 12 and 13. After one hour under the same conditions, the flux dropped to 0.017 mmol $CO_2$/m²-s and to about $6 \times 10^{-5}$ mmol $CO_2$/m²-s after 24 hours due primarily to changes in the $CO_2$ driving force across the membrane 150. In the envisioned application of this system, the decreasing flux is not an issue as the photosynthetic activity of the photoautotrophs will maintain a strong driving force for $CO_2$ transport. However, significant reduction in external mass transfer resistance will be necessary for practical application of this system.

Example 4

Integrated $CO_2$ Adsorption and Desorption with $CO_2$ Delivery

An integrated experiment was used to demonstrate $CO_2$ adsorption and desorption coupled with $CO_2$ delivery via a membrane contactor 320. A packed bed column with of APTES sorbent 110 was used to capture $CO_2$ from a gaseous stream 100. The 17.4 mL column was first filled with 0.5 g of glass wool then 1 g of 3 min glass beads 280. Then 10 g of the APTES sorbent 110 was placed on top of the glass beads 280 and another 1 g of 3 mm glass beads 280 was placed on top of the APTES sorbent 110.

A 12.0% mol/mol $CO_2$ (the rest $N_2$) stream 100 was fed into the column at a rate of 0.05 SCFH (standard cubic feet per hour) (22.39 mL/min). The amount of $CO_2$ in the exit stream 102 was measured using a quadrupole mass spectrometer and the amount of $CO_2$ adsorbed was calculated using a breakthrough curve. The amount of $CO_2$ adsorbed was 1.54 mg as C. The adsorption of $CO_2$ by the amine sorbent 110 occurred within twenty minutes.

Figure 14:
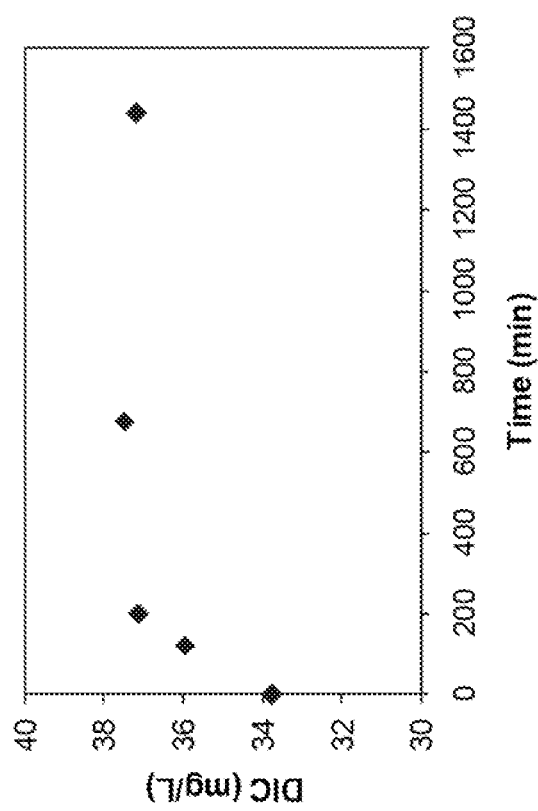
FIG. 14 shows concentration of DIC as a function of time in the bicarbonate solution in contact with the APTES sorbent in Example 4, with initial concentration of 33.76 mg/L and final concentration of 37.18 mg/L.

After an hour of flowing gaseous mix of $CO_2/N_2$, the gas valves were closed and the stripping solution 120 was flowed over the column to remove $CO_2$ from the APTES sorbent 110. A stripping solution 120 was prepared by mixing NaOH and $NaHCO_3$ to produce the necessary pH and DIC levels. The initial DIC concentration in the stripping solution 120 was measured to be 33.76 mg/L. The stripping solution 120 was in contact with the sorbent 110 for 24 hours while 1.5 mL grab samples were used to determine the DIC concentration over time (FIG. 14). The final DIC concentration was measured to be 37.18 mg/L. The resulting 3.42 mg/L increase in DIC concentration corresponds to stripping 1.37 mg of $CO_2$ from the sorbent 110 or 88.9% removal.

Figure 15:
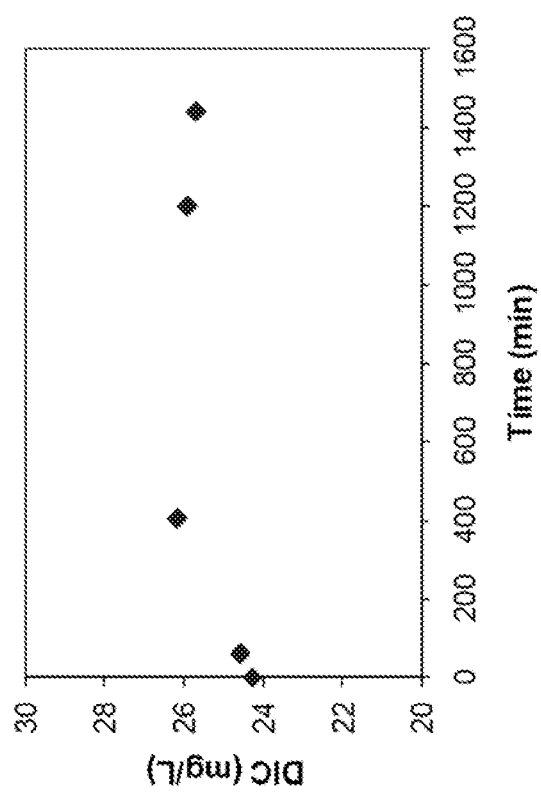
FIG. 15 shows concentration of DIC as a function of time in the synthetic seawater solution in Example 4, with initial concentration of 24.28 mg/L and the final concentration of 25.71 mg/L.

After 24 hours the flow of the loaded stripping solution 140 was then redirected to the membrane contactor 320. The receiving water solution 160, on the permeate side of the membrane contactor 320, was a $CO_2$-poor seawater solution 160 with an initial DIC concentration of 24.28 mg/L and a pH of 8.28 used to simulate the algal broth in a photobioreactor. The receiving aqueous solution 160 was made by placing 17.97 g of Instant Ocean® inside a Tedlar® bag reactor. Then 500 mL of boiling deionized water was pumped into the bag to dissolve the Instant Ocean® salts. The DI water was boiled to minimize uptake of ambient $CO_2$. Afterwards, solution 160 was pumped out of the bag reactor and used for initial measurements leaving a final volume of 400 mL. The synthetic seawater 160 and the stripping solution 120 were in contact with the PDMS membrane 150 for about 24 hours. Grab samples were removed from the synthetic seawater solution 190 to determine the DIC concentration over time (FIG. 15). The final DIC concentration in the seawater 190 was 25.71 mg/L resulting in a 1.43 mg/L increase in DIC concentration.

The increase in DIC concentration corresponds to 0.57 mg of $CO_2$ delivered to the synthetic sea water solution 190 from the captured $CO_2$ APTES sorbent 110.

In practice the $CO_2$ in the seawater would be consumed by the photoautotrophs to produce a biofuel. The continuous production and removal of the biofuel provides a nearly continuous $CO_2$ driving force. This experiment demonstrates a method of delivering $CO_2$ from gaseous phase to aqueous phase in a form that is consumed by photoautotrophs during photosynthetic processes using a solid sorbent and a gas permeable membrane contactor 320.

Example 5

Prophetic Example of Economic Modeling

A production target of 6,000 gallons of ethanol per acre per year is over 10 times greater than the productivity of corn-based ethanol. See Luo et al., Life Cycle Energy and Greenhouse Gas Emissions for an Ethanol Production Process Based on Blue-Green Algae. *Environmental Science & Technology* 2010, 44, (22), 8670-8677. This $CO_2$ demand would require about 2100 mol $CO_2$ per acre per day. Assuming a $CO_2$ permeance consistent with elimination of external mass transfer resistance (i.e., 24 GPU) and continuous delivery for 12 hours of daylight each day, the system would require about 80 $m^2$ of membrane surface per acre or about 0.013 $m^2$ per gal of ethanol produced per year. At \$100 per $m^2$ for the full membrane unit cost, the capital investment would be about \$1.3 on this per gal basis. Amortized over 15 years, the contribution to the cost of a gallon of ethanol would be about \$0.09, a cost that would be offset, at least partially, by the cost savings in the $CO_2$ capture system. In comparison, a \$50/tonne cost for $CO_2$ capture translates, stoichiometrically, to about \$0.30 per gallon of ethanol. See Solomon et al., IPCC 2007: Climate Change 2007: The Physical Science Basis. Contribution of Working Group I to the Fourth Assessment Report of the Intergovernmental Panel on Climate Change. Cambridge University Press, Cambridge, United Kingdom and New York, N.Y., USA, 2007.

Equivalents

Those of ordinary skill in the art will recognize, or be able to ascertain, using no more than routine experimentation, many equivalents to the specific embodiments of the invention described herein. Such equivalents are intended to be encompassed by the following claims. The invention is embodied in each novel characteristic and each combination of characteristics, which particularly includes every combination of any features which are stated in the claims, even if this feature or this combination of features is not explicitly stated in the claims or in the examples.

What is claimed is:

1. A system for delivery of carbon to a photoautotroph comprising:
    (a) a stream containing $CO_2$;
    (b) a solid adsorbent comprising materials suitable for $CO_2$ capture;
    (c) a carbonate-based stripping fluid;
    (d) a device for washing the sorbent, loaded with $CO_2$ from the stream, with the carbonate stripping fluid, thereby allowing removal of $CO_2$ from the sorbent and formation of a bicarbonate rich contacting solution;
    (e) a $CO_2$ selective dense (non-porous) polymer membrane incorporated into a module allowing transfer of $CO_2$ between the bicarbonate rich contacting solution and a photoautotroph culture medium;
    (f) a baffle disposed on a surface of the $CO_2$ selective dense (non-porous) polymer membrane; and
    (g) a microfiltration membrane which prevents direct contact between the photoautotroph culture medium and the bicarbonate rich contacting solution, wherein the photoautotroph culture medium is enriched with bicarbonate providing carbon for growth of the photoautotroph.

2. The system of claim 1, wherein the $CO_2$ selective dense (non-porous) polymer membrane comprises a polymer selected from the group consisting of glassy polymers with operating pore sizes smaller than the size of a hydrated sodium cation or a hydrated carbonate or bicarbonate anion and non-porous rubbery polymers.

3. The system of claim 1, wherein the $CO_2$ selective dense (non-porous) polymer membrane comprises a polymer selected from the group consisting of polydimethylsiloxane, cellulose acetate, polyimides and polyether sulfones.

4. The system of claim 1, wherein the $CO_2$ permeability of the $CO_2$ selective dense (non-porous) polymer membrane is approximately 100-10,000 Barrer.

5. The system of claim 1, wherein the $CO_2$ selective dense (non-porous) polymer membrane comprises polydimethylsiloxane with $CO_2$ permeability of 3800 Barrer at 35° C.

6. The system of claim 1 wherein the $CO_2$ selective dense (non-porous) polymer membrane comprises polydimethylsiloxane with $CO_2$ permeability of 2170 Barrer at 22° C.

7. The system of claim 1, wherein the $CO_2$ selective dense (non-porous) polymer membrane comprises polydimethylsiloxane with $CO_2$ gas selectivity of $\alpha CO_2/O_2=5.5$ and $\alpha CO_2/N_2=10.5$ at 22° C.

8. The system of claim 1, wherein the stream containing $CO_2$ is air.

9. The system of claim 1, wherein the photoautotroph is an alga.

10. The system of claim 1, wherein the photoautotroph is a cyanobacterium.

11. The system of claim 1, wherein the sorbent is an amine-functionalized polymer or inorganic substrate.

12. The system of claim 1, wherein the sorbent is 3-Aminopropyltriethoxysilane (APTES).

13. The system of claim 1, wherein the stripping solution is a sodium-based carbonate solution.

14. A method for delivering carbon to a photoautotroph comprising:
    (a) providing a stream containing $CO_2$;
    (b) passing the $CO_2$ over a solid adsorbent comprising materials suitable for $CO_2$ capture;
    (c) passing a carbonate-based stripping fluid over the $CO_2$ loaded sorbent, thereby allowing the removal of $CO_2$ from the sorbent and formation of a bicarbonate contacting solution;
    (d) utilizing a $CO_2$ selective dense (non-porous) polymer membrane that allows the transfer of $CO_2$ between the bicarbonate rich contacting solution and a photoautotroph culture medium, wherein a baffle is disposed on a surface of the $CO_2$ selective dense (non-porous) polymer membrane; and
    (e) utilizing a microfiltration membrane to prevent direct contact between the photoautotroph culture medium and the bicarbonate rich contacting solution, wherein, the photoautotroph culture medium is enriched with bicarbonate providing carbon for growth of the photoautotroph.

15. The method of claim 14, further comprising increasing flow rates of the bicarbonate rich contacting solution and the photoautotroph culture medium across surfaces of the $CO_2$ selective dense (non-porous) polymer membrane and increasing shear mixing.

16. A system for delivery of carbon dioxide to a photoautotroph comprising:
  (a) a carbon dioxide-adsorbing device comprised of adsorbent particles comprising amine functionality suitable for capture of carbon dioxide;
  (b) a stripping device which removes carbon dioxide from the adsorbent particles loaded with carbon dioxide wherein the stripping device comprises a stripping solution comprising carbonate and bicarbonate anions;
  (c) a $CO_2$ selective dense (non-porous) polymer membrane incorporated into a module allowing transfer of $CO_2$ between a bicarbonate rich contacting fluid and a photoautotroph culture medium; and
  (d) a baffle disposed on a surface of the $CO_2$ selective dense (non-porous) polymer membrane.

17. The system of claim 16 wherein the stripping device provides a stripping solution with dissolved inorganic carbon (DIC) concentration in the range 270 mg/L to 12,000 mg/L and the photoautotrophic culture medium has an operating DIC range from 0.3 mg/L to 3,000 mg/L.

\* \* \* \* \*